United States Patent
Daniels et al.

(10) Patent No.: US 8,360,179 B2
(45) Date of Patent: Jan. 29, 2013

(54) MACHINE SUSPENSION SYSTEM HAVING TORSION AXLE ASSEMBLIES

(75) Inventors: Christopher E. Daniels, Fuquay-Varina, NC (US); Michael S. Freberg, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 299 days.

(21) Appl. No.: 12/837,096

(22) Filed: Jul. 15, 2010

(65) Prior Publication Data

US 2012/0012407 A1  Jan. 19, 2012

(51) Int. Cl.
*D62D 55/08* (2006.01)

(52) U.S. Cl. .................. 180/9.5; 180/9.58; 280/124.169

(58) Field of Classification Search .................. 180/9.5, 180/9.52, 9.54, 9.6, 9.58; 305/125, 129, 305/130, 134; 280/124.128, 124, 13, 124.169
See application file for complete search history.

(56) References Cited

U.S. PATENT DOCUMENTS

| | | | |
|---|---|---|---|
| 2,310,775 A | 2/1943 | Gavagnin | |
| 2,998,981 A | 9/1961 | Derr et al. | |
| 3,606,373 A * | 9/1971 | Knott | 280/684 |
| 3,737,173 A * | 6/1973 | Boissier et al. | 280/684 |
| 4,072,203 A | 2/1978 | Pierson | |
| 4,223,742 A * | 9/1980 | Stark | 172/456 |
| 4,406,501 A | 9/1983 | Christensen | |
| 4,553,790 A | 11/1985 | Boggs | |
| 4,953,919 A | 9/1990 | Langford | |
| 5,411,287 A * | 5/1995 | Henschen | 280/124.169 |
| 5,899,543 A | 5/1999 | Lykken et al. | |
| 6,164,399 A | 12/2000 | Bays | |
| 6,283,562 B1 | 9/2001 | Tsubota et al. | |
| 6,401,847 B1 | 6/2002 | Lykken | |
| 6,588,778 B1 * | 7/2003 | McLaughlin | 280/124.13 |
| 6,810,975 B2 | 11/2004 | Nagorcka et al. | |
| 7,261,287 B2 * | 8/2007 | Gehret | 267/279 |
| 7,328,760 B2 | 2/2008 | Inaoka et al. | |
| 7,497,530 B2 | 3/2009 | Bessette | |
| 7,617,881 B2 | 11/2009 | Radke et al. | |
| 7,967,087 B2 * | 6/2011 | Arulraja et al. | 180/9.5 |
| 2001/0001431 A1 | 5/2001 | Lemke et al. | |
| 2003/0034189 A1 * | 2/2003 | Lemke et al. | 180/116 |
| 2009/0321152 A1 | 12/2009 | Arulraja et al. | |
| 2010/0060075 A1 | 3/2010 | Hansen | |

* cited by examiner

*Primary Examiner* — Anne Marie M Boehler
(74) *Attorney, Agent, or Firm* — Finnegan, Henderson, Farabow, Garrett & Dunner LLP

(57) ABSTRACT

A suspension system for a machine is disclosed. The suspension system may have a front torsion axle assembly with a first arm connected at a first end to a first shaft, and a first axle connected to a second end of the first arm. The suspension system may also have a rear torsion axle assembly with a second arm connected at a first end to a second shaft, and a second axle connected to a second end of the second arm. The suspension system may further have a frame connected to an end of the first shaft and an end of the second shaft. The second ends of the first and second arms are oriented within common angular quadrants defined by a coordinate system having an axis passing through the first ends of the first and second arms and aligned with a travel direction of the machine.

18 Claims, 4 Drawing Sheets

MACHINE SUSPENSION SYSTEM HAVING TORSION AXLE ASSEMBLIES

TECHNICAL FIELD

The present disclosure is directed to a suspension system and, more particularly, to a machine suspension system having torsion axle assemblies.

BACKGROUND

Compact construction machines, for example skid steer loaders, are commonly used in applications where working space is limited. These machines include a frame that supports an internal combustion engine, and left and right undercarriages that transfer power from the engine to a ground surface. Typical compact construction machines utilize rigid mounting between the frame and the undercarriages, with sprockets of the undercarriages being indirectly driven by the engine via a hydraulic motor. This type of mounting between the frame and the undercarriages, because of its rigidity, can transfer machine-induced loads and vibrations to an operator, making long periods of machine usage uncomfortable for the operator. In addition, the rigid mounting can, in some instances, cause one of the undercarriages to lift off of the ground surface, thereby reducing traction, steering control, and machine stability.

Another type of suspension system for a compact construction machine is described in U.S. Patent Publication No. 2009/0321152 of Arulraj a et al. that was published on Dec. 31, 2009 ("the '152 publication"). Specifically, the '152 publication discloses a machine having a frame, a front torsion axle assembly, a rear torsion axle assembly, and a tracked undercarriage. The front and rear torsion axle assemblies each include a torsion arm, a torsion shaft, and an axle. The torsion shaft and the axle extend in different directions from opposing ends of the torsion arm. The torsion shafts of the front and rear torsion axle assemblies are rigidly attached to the frame at spaced apart fore and aft locations. The axle of the front torsion axle assembly is attached via a sleeve bearing to an upper frame surface of the undercarriage, while the axle of the rear torsion axle assembly is attached via a sleeve bearing located within the frame at a position just forward of a drive sprocket. The torsion arm of the front torsion axle assembly extends upward from the frame at an angle between 90 and 180 degrees. The torsion arm of the rear torsion axle assembly extends downward from the frame at an angle between 270 and 360 degrees.

During loaded operation of the machine of the '152 publication, the torsion axle assemblies are configured to flex independently. In particular, as the machine becomes loaded, because of a transverse offset between the torsion shaft and the axle of each assembly, a moment is created about each axle that causes individual torsion arms to rotate against a cushion of rubber cords located within the torsion shaft. This cushioned rotation causes the machine frame to move rearward and downward relative to the undercarriage, reducing a risk of tipping at both the front and rear torsion axle assemblies and increasing a reaction force at the front torsion axle assembly.

SUMMARY

One aspect of the present disclosure is directed to a suspension system for a machine. The suspension system includes a front torsion axle assembly having a first shaft, a first arm connected at a first end to the first shaft, and a first axle connected to a second end of the first arm and extending from the first arm in a direction opposite the first shaft. The suspension system also includes a rear torsion axle assembly having a second shaft, a second arm connected at a first end to the second shaft, and a second axle connected to a second end of the second arm and extending from the second arm in a direction opposite the second shaft. The suspension system further includes a frame configured to support an engine and being connected to an end of the first shaft and an end of the second shaft. The second ends of the first and second arms are oriented within common angular quadrants defined by a coordinate system having an axis passing through the first ends of the first and second arms and aligned with a travel direction of the machine.

Another aspect of the present disclosure is directed to a suspension system for a machine. This suspension system includes an undercarriage, a sprocket mounted on the undercarriage, and a traction device supported by the undercarriage and driven by the sprocket. The suspension system also includes a first torsion axle assembly, and a sleeve bearing located at a first end of the undercarriage and configured to slidingly receive a first end of the first torsion axle assembly. The suspension system further includes a second torsion axle assembly, and a roller bearing located at a second end of the undercarriage and configured to rotatably receive a first end of the second torsion axle assembly. The sprocket is located in a fore/aft machine direction between the roller bearing and the sleeve bearing.

DETAILED DESCRIPTION

Figure 1:
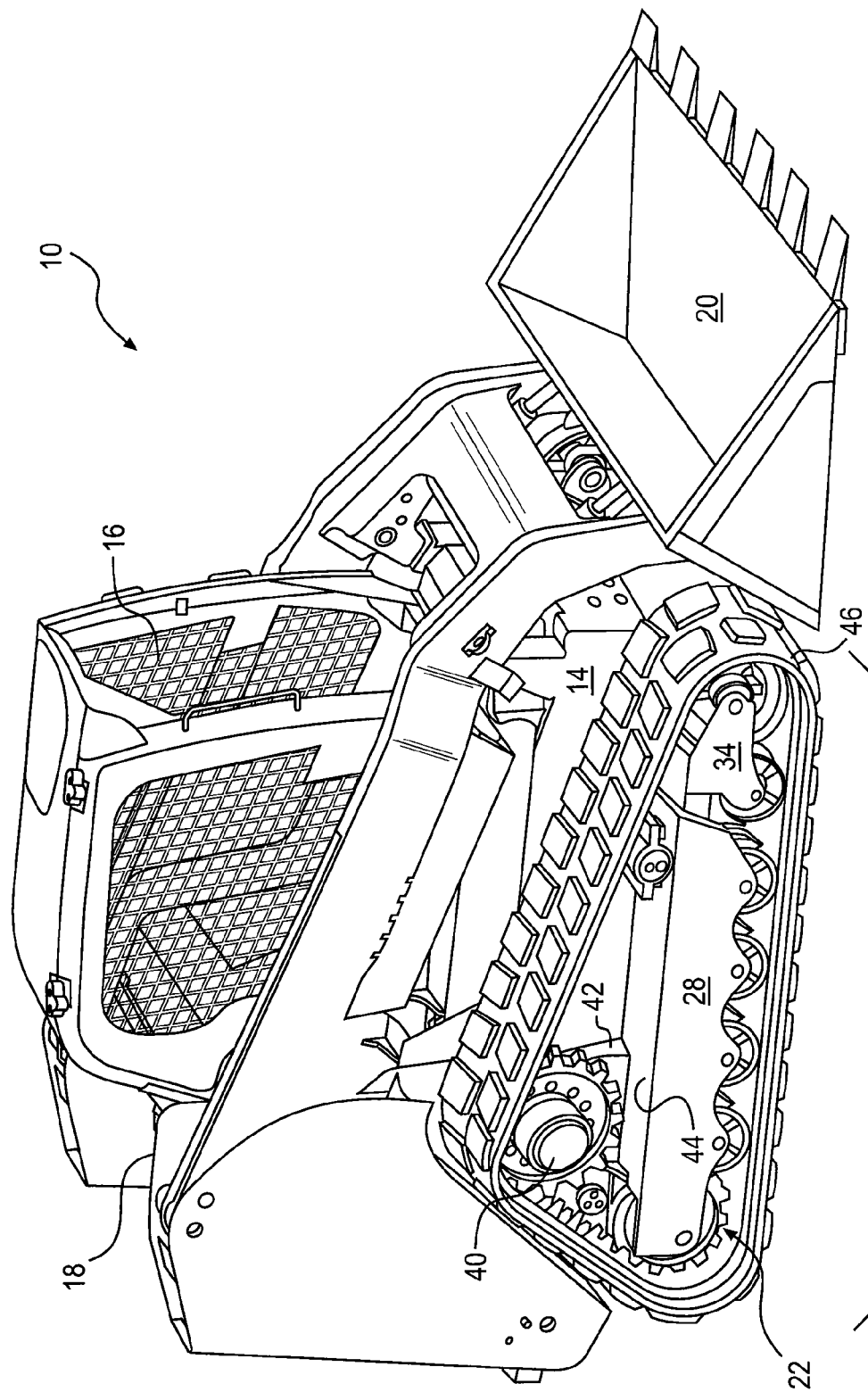
FIG. 1 is a pictorial illustration of an exemplary disclosed machine.

FIG. 1 illustrates a mobile machine 10 having an exemplary disclosed suspension system 12. In accordance with one aspect of this disclosure, machine 10 is illustrated as a compact track loader. It should be noted, however, that suspension system 12 may be used with another type of tracked machine, if desired. Machine 10 includes a frame 14 at least partially defining an operator station 16 and supporting a rear-mounted engine 18, and a work tool 20 operatively connected to a front end of frame 14 opposite engine 18. Engine 18 generates a power output directed to propel machine 10 and to move work tool 20. Operator station 16 may include any number and type of input devices used by an operator for control of suspension system 12, engine 18, and/or work tool 20.

Figure 2:
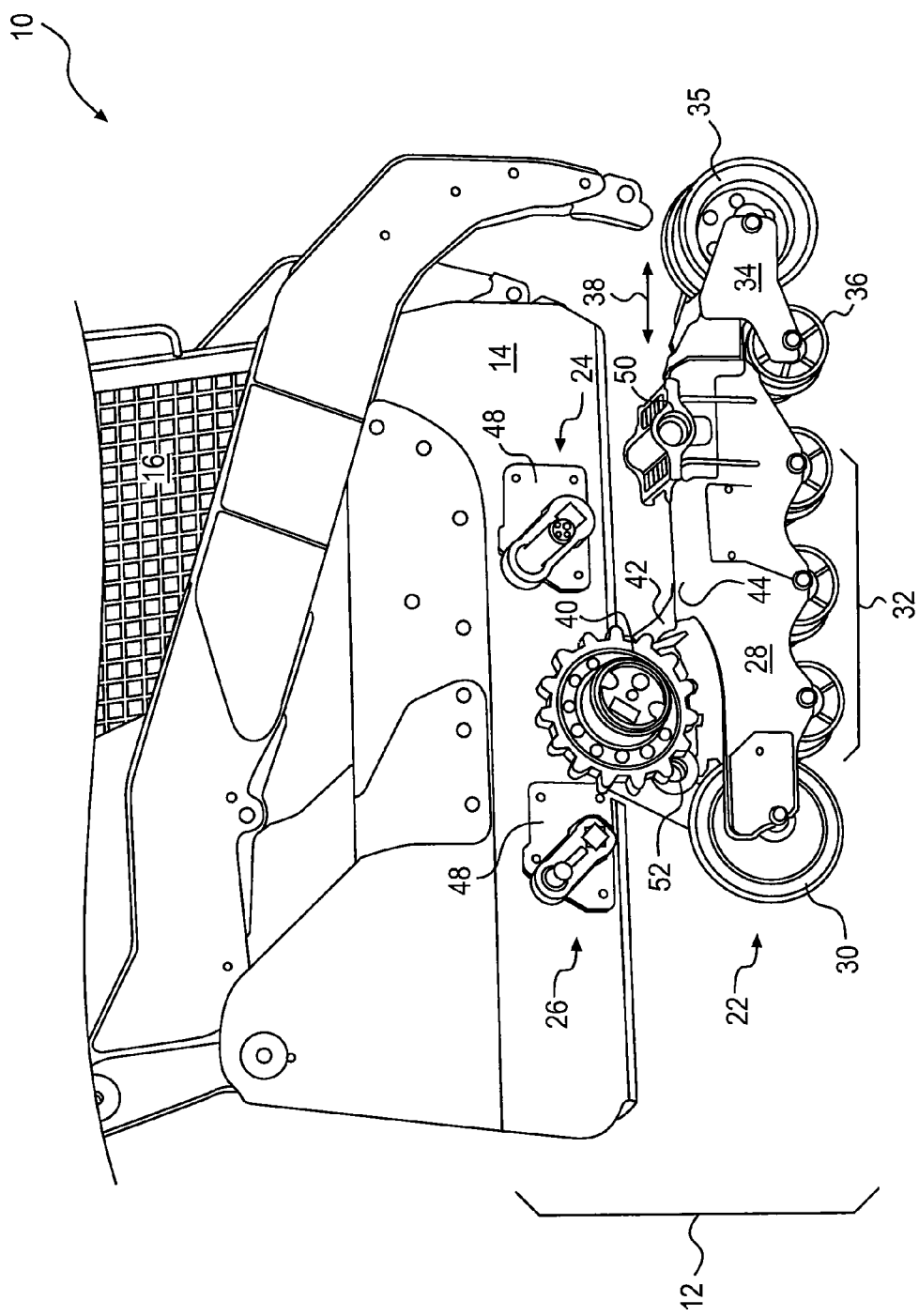
FIG. 2 is an exploded view pictorial illustration of an exemplary disclosed suspension system that may be used with the machine of FIG. 1.

As shown in FIG. 2, suspension system 12 includes an undercarriage 22 located on opposing sides of machine 10 (only one side shown in FIG. 2), and front and rear torsion axle assemblies 24, 26 connecting each undercarriage 22 to frame 14. Undercarriage 22 includes a rear frame 28 housing a rear idler 30 and a plurality of rear rollers 32, and a front frame 34 housing a front idler 35 and a front roller 36. Front frame 34 is operatively connected to rear frame 28 such that front frame 34 moves relative to rear frame 28 in directions indicated by an arrow 38. Front frame 34 may be biased away from rear frame 28 via a grease ram or another track recoil system (not shown). A drive sprocket 40 is rotatably mounted to rear frame 28 via a flange 42 that extends upward from an upper surface 44 of rear frame 28 in a direction away from rear rollers 28, at an end of rear frame 28 opposite front frame 34. Drive sprocket 40 is powered by engine 18 to drive an endless track 46 (shown in FIG. 1) that encircles undercarriage 22.

Front torsion axle assembly 24 is rigidly mounted to frame 14 and slidingly mounted to undercarriage 22. Specifically, front torsion axle assembly 24 is directly connected to frame 14, for example by way of a flange 48 and bolts (not shown), and undercarriage 22 includes a sleeve bearing 50 mounted to upper surface 44 of rear frame 28 that is configured to slidingly receive front torsion axle assembly 24. With this configuration, front torsion axle assembly 24 is restricted from movement relative to frame 14, but capable of sliding rotationally relative to sleeve bearing 50 of undercarriage 22. A plate (not shown) or other similar retaining component known in the art may engage an end of front torsion axle assembly 24 at sleeve bearing 50 to restrict axial movements of front torsion axle assembly 24 relative to undercarriage 22.

Rear torsion axle assembly 26 is rigidly mounted to frame 14 and rotatably mounted to undercarriage 22. Specifically, rear torsion axle assembly 26 is directly connected to frame 14, for example by way of flange 48 and bolts (not shown), and undercarriage 22 includes a roller bearing 52, for example a spherical roller bearing, mounted within flange 42 of rear frame 28 that is configured to receive rear torsion axle assembly 26. With this configuration, rear torsion axle assembly 26 is restricted from movement relative to frame 14, but capable of rotating relative to roller bearing 52 of undercarriage 22. A plate (not shown) or other similar retaining component known in the art may engage an end of rear torsion axle assembly 26 at roller bearing 52 to restrict the axial movement of rear torsion axle assembly 26 relative to undercarriage 22.

Figure 3:
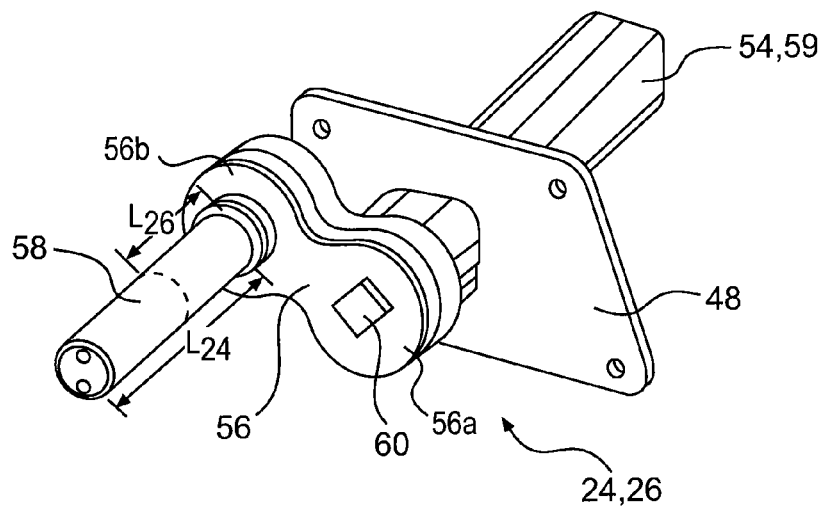
FIG. 3 is an pictorial illustration of an exemplary disclosed torsion axle assembly that may be used with the suspension system of FIG. 2.

As shown in FIG. 3, each of front and rear torsion axle assemblies 24, 26 includes a shaft 54, an arm 56 connected at a first end 56a to shaft 54, and an axle 58 connected to a second end 56b of arm 56. Shaft 54 extends from arm 56 in a direction generally opposite axle 58. Flange 48 is fixedly connected to an external surface of shaft 54, for example by welding or by threaded fasteners. Axles 58 of front and rear torsion axle assemblies 24, 26 are received within sleeve and roller bearings 50, 52, respectively. In one embodiment, axle 58 of front torsion axle assembly 24 may have a length $L_{24}$ that is longer than an axle length $L_{26}$ of rear torsion axle assembly 26.

Figure 4:
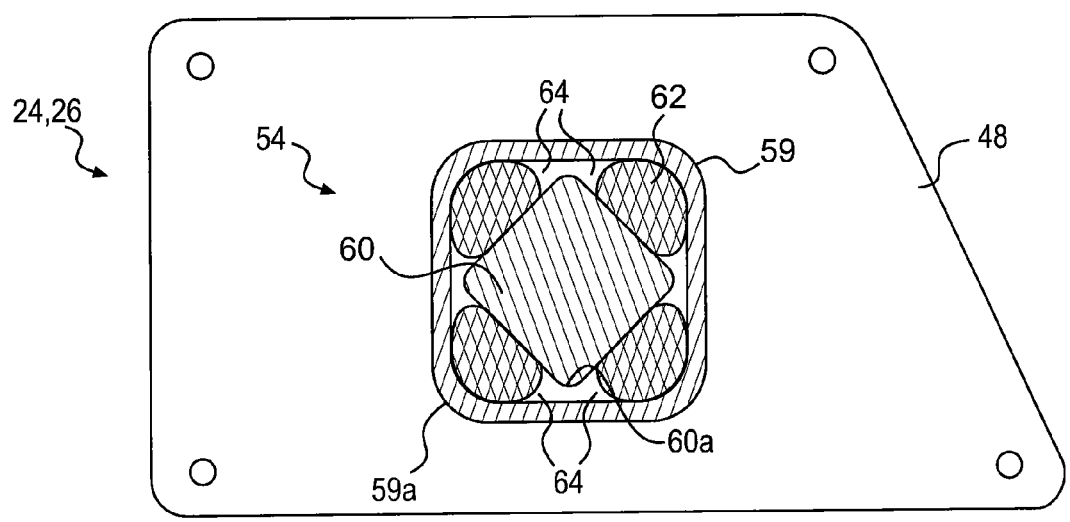
FIG. 4 is an cross-sectional illustration of the torsion axle assembly of FIG. 3.

FIG. 4 illustrates details of shaft 54. Shaft 54 is a subassembly including an outer tube 59 attached to frame 14 via flange 48, an inner bar 60, and elastomeric cords 62 positioned in spaces 64 formed between outer tube 59 and inner bar 60. Outer tube 59 and inner bar 60, in one embodiment, may both be generally square, although other shapes are also contemplated. Inner bar 60 is fixedly connected to end 56a of arm 56 and slidingly received within outer tube 59, while outer tube 59 is relatively free to rotate and translate with respect to arm 56 (i.e., outer tube 59 is not fixedly connected to arm 56). Inner bar 60 is positioned such that corners 60a of inner bar 60 are located about midway between corners 59a of outer tube 59 (i.e., inner bar 60 is oriented about 45° out of alignment with respect to outer tube 59). As arm 56 pivots relative to frame 14 during operation of machine 10, inner bar 60 rotates relative to outer tube 59. This rotation of inner bar 60 causes corners 60a to move into spaces 64 and compress cords 62. In this manner, cords 62 resist and cushion the rotation of inner bar 60 and arm 56. In one embodiment, cords 62 may be fabricated from a rubber, vinyl, or plastic material.

Figures 5, 6:
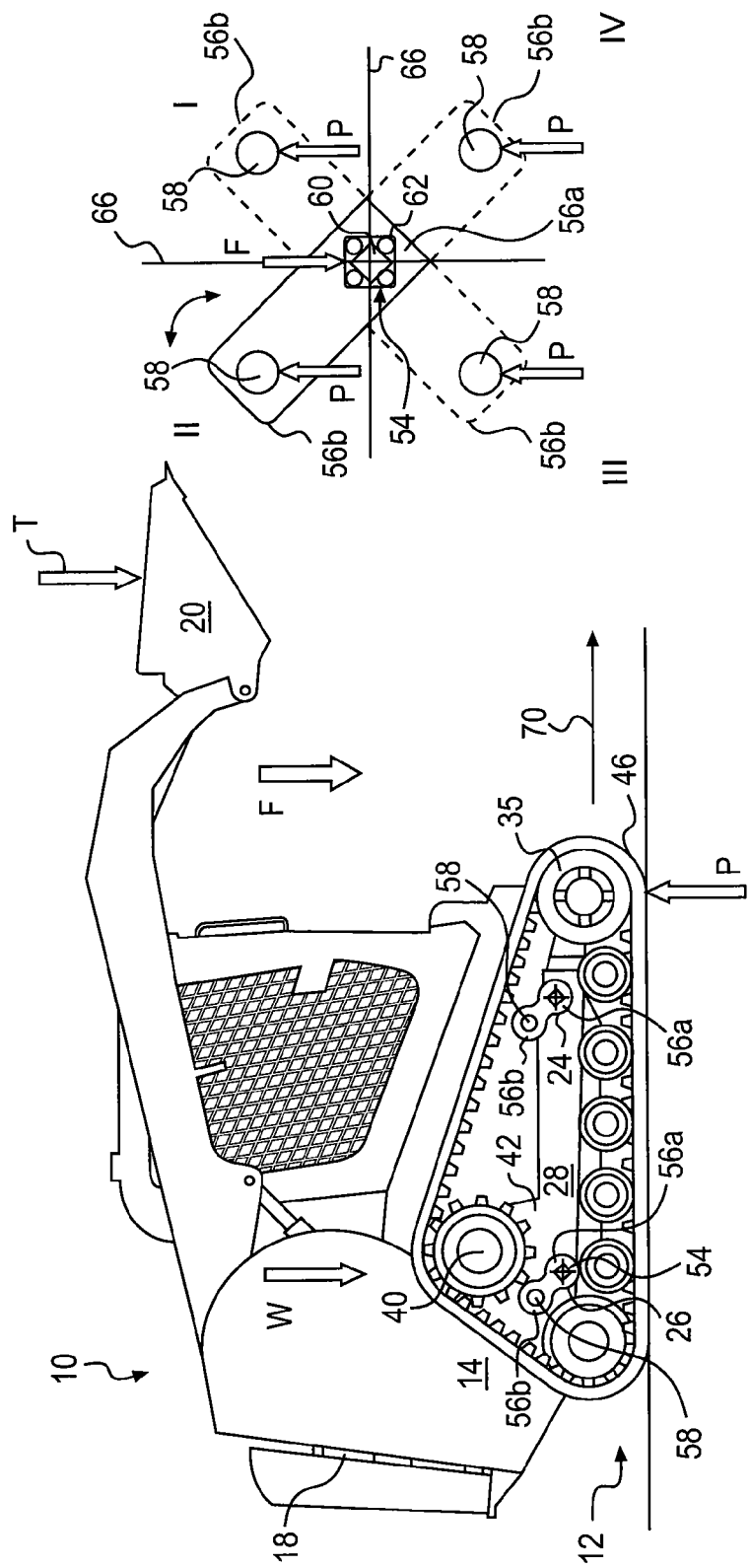
FIG. 5 is a free-body diagram of the machine of FIG. 1.
FIG. 6 is a diagrammatic illustration of the torsion axle assembly of FIG. 3.

As seen in FIG. 5, front and rear torsion axle assemblies 24, 26 are oriented generally parallel to each other. That is, second ends 56b of front and rear torsion axle assemblies 24, 26 are located within a common angular quadrant defined by coordinate axis 66 that pass through first end 56a of arm 56 (i.e., that pass through an axial center of inner bar 60) and are generally aligned with a travel direction of the machine 10 indicated by an arrow 70. In one embodiment, arms 56 of front and rear torsion axle assemblies 24, 26 may be parallel relative to each other within a range of about +/−10°. This parallel arrangement may provide for generally equal distribution of loads between front and rear torsion axle assemblies 24, 26 and, as will be described in greater detail below, help to maintain a level posture of machine 10 during heavy loading. In another embodiment, arms 56 of front and rear torsion axle assemblies 24, 26 may be parallel with each other within a range of about +/−5°, and more specifically within a range of about +/−2°. Greater weight distribution and more level posturing of machine 10 may be obtained as arms 56 of front and rear torsion axle assemblies become more parallel with each other.

In the exemplary embodiment, the common angular quadrant in which first ends 56 are co-located may be the second quadrant shown in FIG. 6 corresponding with a range of angles between about 90° and about 180°, when measured counterclockwise from a forward travel direction of machine 10. In another embodiment, second end 56b may be located more particularly within a range of angles between about 120° and about 135°. In this position, axles 58 are located further away from a front end of machine 10 (i.e., further away from work tool 20) and further away from a ground engagement of track 46 than shafts 54. By positioning second end 56b at this location within the narrowed range of angles of the second quadrant, front and rear torsion axle assemblies 24, 26 are inhibited by cords 62 (referring to FIG. 4) from moving to a location that results in undesired ride performance (i.e., excessive oscillations or rigidity). The angular positioning of arm 56 described above corresponds with an unloaded condition of machine 10, when machine 10 is situated on a level ground surface.

Front and rear torsion axle assemblies 24, 26 are oriented to provide machine tipping resistance and high ride performance. FIG. 5 illustrates machine 10 having an empty weight "W" acting through a center of gravity of machine 10 and being exposed to a tool load "T" at work tool 20. A combined force "F" equal to T+W is shown in FIG. 5 as acting at a location between where the tool force T and the weight W are shown as acting. As the tool force T increases, the location of the combined force F moves forward. When the location of the combined force F moves forward past front idler 35, machine 10 may tip forward. During this loading, a reaction to the combined force F is represented by a force "P" shown as acting at front idler 35. The combined force F is transferred from frame 14 to front and rear torsion axle assemblies 24, 26 via shaft 54, while the force P is transferred from undercarriage 22 to front and rear torsion axle assemblies 24, 26 via axle 58.

FIG. 6 illustrates forces acting on front and rear torsion axle assemblies 24, 26 during operation of machine 10 when second end 56b of arm 56 is located in different quadrants.

FIG. 6 will be discussed in more detail in the following section to better illustrate the disclosed system and its operation.

INDUSTRIAL APPLICABILITY

The suspension system of the present disclosure has wide application in a variety of machine types including, for example, loaders. The disclosed suspension system finds particular applicability with compact machines that utilize endless tracks, where undercarriage space, operator comfort, and machine handling are a concern.

During operation of machine 10, as machine 10 travels over uneven terrain, each torsion arm assembly 24, 26 may pivot about axle 58 to cushion the operator. For example, as undercarriage 22 encounters a dip in a ground surface, undercarriage 22 may be urged by the force of compressed cords 62 downward into the dip, pivoting on axle 58 away from frame 14 and allowing cords 62 to decompress somewhat. Similarly, when exiting the dip, undercarriage 22 may move back upward, pivoting on axle 58 toward frame 14 and recompressing cords 62. Depending on the size of the dip and the responsiveness of cords 62, frame 14 may remain at about the same elevation during the downward and upward movements of undercarriage 22, with little or no movement of undercarriage 22 being transmitted to the operator. In addition, the upward and downward movements of undercarriages 22 relative to frame 14 may help ensure that tracks 46 remain on the ground surface, thereby providing sufficient traction for machine 10.

In addition to cushioning, the front and rear torsion axle assemblies 24, 26 can assist in reducing tipping and improving traction. FIG. 6 illustrates the forces acting on front and rear torsion axle assemblies 24, 26 during operation when second end 56b of arm 56 is located in different quadrants (quadrants I, II, III, and IV illustrated in FIG. 6). Assuming that axle 58 remains relatively stationary during loading of machine 10, when second end 56b of arm 56 is located in the first quadrant (I) of FIG. 6, the combined force F acting downward on shaft 54 may cause first end 56a of arm 56 to rotate downward and forward relative to second end 56b (i.e., downward and towards front idler 35). This rotation functions to move the acting location of the combined force F forward toward or even past front idler 35. The rotation and resulting forward movement of the acting location of the combined force F is undesirable and functions to increase a risk of tipping as machine 10 becomes heavily loaded. Additionally, the downward and forward motion of first end 56a relative to second end 56b, functions to decrease a horizontal distance between first end 56a and second end 56b of arm 56. The shorter horizontal distance between first and second ends 56a, 56b reduces a reactive moment caused by the force P acting through arm 56 on shaft 54. Thus, to maintain the same reactive moment at shaft 54, the force P will increase. An increasing reaction force P exerted between the ground surface and track 46 is desirable and helps to improve traction.

When second end 56b of arm 56 is located in the second quadrant (II) of FIG. 6, the combined force F acting downward on shaft 54 may cause first end 56a of arm 56 to rotate downward and rearward relative to second end 56b (i.e., downward and toward rear idler 30). This rotation functions to move the acting location of the combined force F rearward away from front idler 35. The rotation and resulting rearward movement of the acting location of the combined force F is desirable and functions to decrease the risk of tipping as machine 10 becomes heavily loaded. Additionally, the downward and rearward motion of first end 56a relative to second end 56b, functions to shorten the horizontal distance between first end 56a and second end 56b of arm 556 and thereby improve traction of machine 10.

When second end 56b of arm 56 is located in the third quadrant (III) of FIG. 6, the combined force F acting downward on shaft 54 may cause first end 56a of arm 56 to rotate downward and forward relative to second end 56b. This rotation moves the acting location of the force F forward toward or even past front idler 34, thereby increasing a risk of machine 10 tipping. In addition, the rotation associated with the third quadrant results in a longer horizontal distance between first end 56a and second end 56b of arm 56, which is undesirable and functions to decrease the force P required to maintain a given reactive moment at shaft 54.

When second end 56b of arm 56 is located in the fourth quadrant (IV) of FIG. 6, the combined force F acting downward on shaft 54 may cause first end 56a of arm 56 to rotate downward and rearward relative to second end 56b. This rotation moves the acting location of the force F rearward, thereby decreasing the tipping risk of machine 10. However, the longer horizontal distance between first end 56a and second 56b of arm 56, as described above, is undesirable and functions to decrease the reaction force P required to maintain a given reactive moment at shaft 54.

By positioning arms 56 of both front and rear torsion axle assemblies 24, 26 in the second quadrant (II), a reducing tipping risk and increasing traction between undercarriage 22 and a ground surface is achieved during loading of work tool 20. In particular, all four torsion axle assemblies 24, 26, because of their location in the second quadrant function to move the acting location of the combined force F rearward away from front idler 34. In addition, the location of all four torsion axle assemblies in the second quadrant reduces the horizontal distance between first and second ends 56a, 56b of arm 56, thereby increasing a reaction force P between undercarriage 22 and the ground surface.

Advantages may be realized by utilizing a combination of sleeve bearings 50 and roller bearings 52 to support axles 58 of front and rear torsion axle assemblies 24, 26. For example, sleeve bearings 50 help maintain proper vertical alignment between undercarriages 22 and frame 14. That is, the supported length of sleeve bearings 50 along axles 58 help resist a tendency of undercarriages 22 to tip inward or outward relative to frame 14. Sleeve bearings 50 also are capable of radially supporting very heavy loads and consume little radial space. In the disclosed application, only a single sleeve bearing 50 is required on each side of machine 10 to adequately support each undercarriage 22. Roller bearings 52 are capable of radially supporting heavy loads, and do so with very low coefficients of friction. Roller bearings 52 also consume very little axial space. In the disclosed application, only a single roller bearing 52 is required on each side of machine 10 to adequately support each undercarriage 22 when used in association with one sleeve bearing 50. Accordingly, the disclosed suspension system includes the benefits associated with of both types of bearings.

Because arms 56 of front and rear torsion axle assemblies 24, 26 are generally parallel, stability and control of machine 10 may be enhanced. Specifically, the parallel arrangement of front and rear torsion axle assemblies 24, 26 may promote generally equal pivoting of second ends 56b about first ends 56a of arms 56 when machine 10 becomes heavily loaded. This generally equal pivoting may provide for a level squatting motion of machine 10 under heavy loads, as opposed to a frontward or rearward tipping that might occur with non-parallel torsion axle assemblies. In addition, the parallel arrangement of front and rear torsion axle assemblies 24, 26 may enhance fore/aft load distribution through undercarriages 22, which may increase machine stability and traction, thereby providing greater control to a machine operator.

It will be apparent to those skilled in the art that various modifications and variations can be made to the suspension system of the present disclosure without departing from the scope of the disclosure. Other embodiments will be apparent to those skilled in the art from consideration of the specification and practice of the suspension disclosed herein. It is intended that the specification and examples be considered as exemplary only, with a true scope of the disclosure being indicated by the following claims and their equivalents.

What is claimed is:

1. A suspension system for a machine, comprising:
   a front torsion axle assembly having a first shaft, a first arm connected at a first end to the first shaft, and a first axle connected to a second end of the first arm and extending from the first arm in a direction opposite the first shaft;
   a rear torsion axle assembly having a second shaft, a second arm connected at a first end to the second shaft, and a second axle connected to a second end of the second arm and extending from the second arm in a direction opposite the second shaft, and
   a frame configured to support an engine and being connected to an end of the first shaft and an end of the second shaft;
   an undercarriage connected to an end of the first axle and an end of the second axle;
   a traction device supported by the undercarriage and driven by the engine;
   a first bearing connected to the undercarriage and configured to receive the first axle; and
   a second bearing connected to the undercarriage and configured to receive the second axle;
   wherein the second ends of the first and second arms are oriented within common angular quadrants defined by a coordinate system having an axis passing through the first ends of the first and second arms and aligned with a travel direction of the machine;
   the first and second axles are located further away from an engagement of the traction device with a ground surface than the first and second shafts; and
   the first and second bearings are different types of bearings.

2. The suspension system of claim 1, wherein:
   the engine is located toward a rear end of the machine;
   the machine includes a work tool located toward a front end of the machine; and
   the first and second axles are located further away from the front end of the machine than the first and second shafts.

3. The suspension system of claim 1, wherein the common angular quadrants each include a counterclockwise angular range of between 90 and 180 degrees when measured from a forward traveling direction of the machine.

4. The suspension system of claim 3, wherein the second ends of the first and second arms are oriented in a range of between about 120-150 degrees relative to the coordinate axis when measured from a forward traveling direction of the machine.

5. The suspension system of claim 1, wherein the first and second torsion axle assemblies are substantially parallel.

6. The suspension system of claim 1, wherein the first and second arms are substantially identical, and the first and second shafts are substantially identical.

7. The suspension system of claim 6, wherein the first and second axles have different lengths.

8. The suspension system of claim 1, wherein the first bearing is a sleeve bearing and the second bearing is a spherical roller bearing.

9. The suspension system of claim 8, further including a sprocket mounted on the undercarriage and powered by the engine to drive the traction device, wherein the sprocket is located between the spherical roller bearing and the sleeve bearing.

10. A suspension system for a machine, comprising:
    an undercarriage;
    a sprocket mounted on the undercarriage;
    a traction device supported by the undercarriage and driven by the sprocket;
    a first torsion axle assembly;
    a sleeve bearing located at a first end of the undercarriage and configured to slidingly receive a first end of the first torsion axle assembly;
    a second torsion axle assembly; and
    a roller bearing located at a second end of the undercarriage and configured to rotatably receive a first end of the second torsion axle assembly, wherein the sprocket is located in a fore/aft machine direction between the roller bearing and the sleeve bearing.

11. The suspension system of claim 10, wherein:
    the undercarriage includes a rear frame extending in a length direction and supporting a plurality of rollers;
    the sleeve bearing is mounted on an upper surface of the rear frame;
    the undercarriage includes a mounting flange connecting the sprocket to the rear frame; and
    the roller bearing in mounted in the mounting flange.

12. The suspension system of claim 10, wherein:
    each of the first and second torsion axle assemblies includes a shaft, an arm connected at a first end to the shaft, and an axle connected to a second end of the arm; and
    the arm of the first torsion axle assembly is generally parallel to the arm of the second torsion axle assembly.

13. The suspension system of claim 12, wherein;
    the first and second torsion axle assemblies have substantially identical shafts and arms; and
    the axle of the first torsion axle assembly has a length different than a length of the axle of the second torsion axle assembly.

14. The suspension system of claim 10, wherein the traction device includes an endless track.

15. The suspension system of claim 10, further including a frame configured to support an engine that powers the sprocket, wherein:
    the first torsion axle assembly is rigidly connected at a second end to the frame, and
    the second torsion axle assembly is rigidly connected at a second end to the frame.

16. The suspension system of claim 15, wherein the frame is configured to pivot under load about the first and second torsion axle assemblies.

17. The suspension system of claim 16, wherein the frame is configured to pivot rearward toward the roller bearing and downward toward a ground surface during loading.

18. A machine, comprising
    an engine;
    a frame configured to support the engine;
    a work tool;
    an extension arm connected between the frame and the work tool;
    an undercarriage having a sprocket powered by the engine;
    an endless track supported by the undercarriage and driven by the sprocket;
    a front torsion axle assembly having a first shaft rigidly connected to the frame, a first arm connected at a first end to the first shaft, and a first axle connected to a second end of the first arm and extending from the first arm in a direction opposite the first shaft to the undercarriage;

a sleeve bearing located at a front end of the undercarriage and configured to slidingly receive the first axle;

a rear torsion axle assembly having a second shaft rigidly connected to the frame, a second arm connected at a first end to the second shaft, and a second axle connected to a second end of the second arm and extending from the second arm in a direction opposite the second shaft to the undercarriage; and a roller bearing located at a rear end of the undercarriage and configured to rotatably receive the second axle, wherein:

the sprocket is located in a fore/aft machine direction between the roller bearing and the sleeve bearing; and the first and second arms are oriented within common angular quadrants having coordinate axis passing through the first ends of the first and second arms and aligned with the fore/aft machine direction.

* * * * *